July 7, 1931.  A. I. RALSTON  1,813,318
STOCK WATERER
Filed April 27, 1926  2 Sheets-Sheet 1
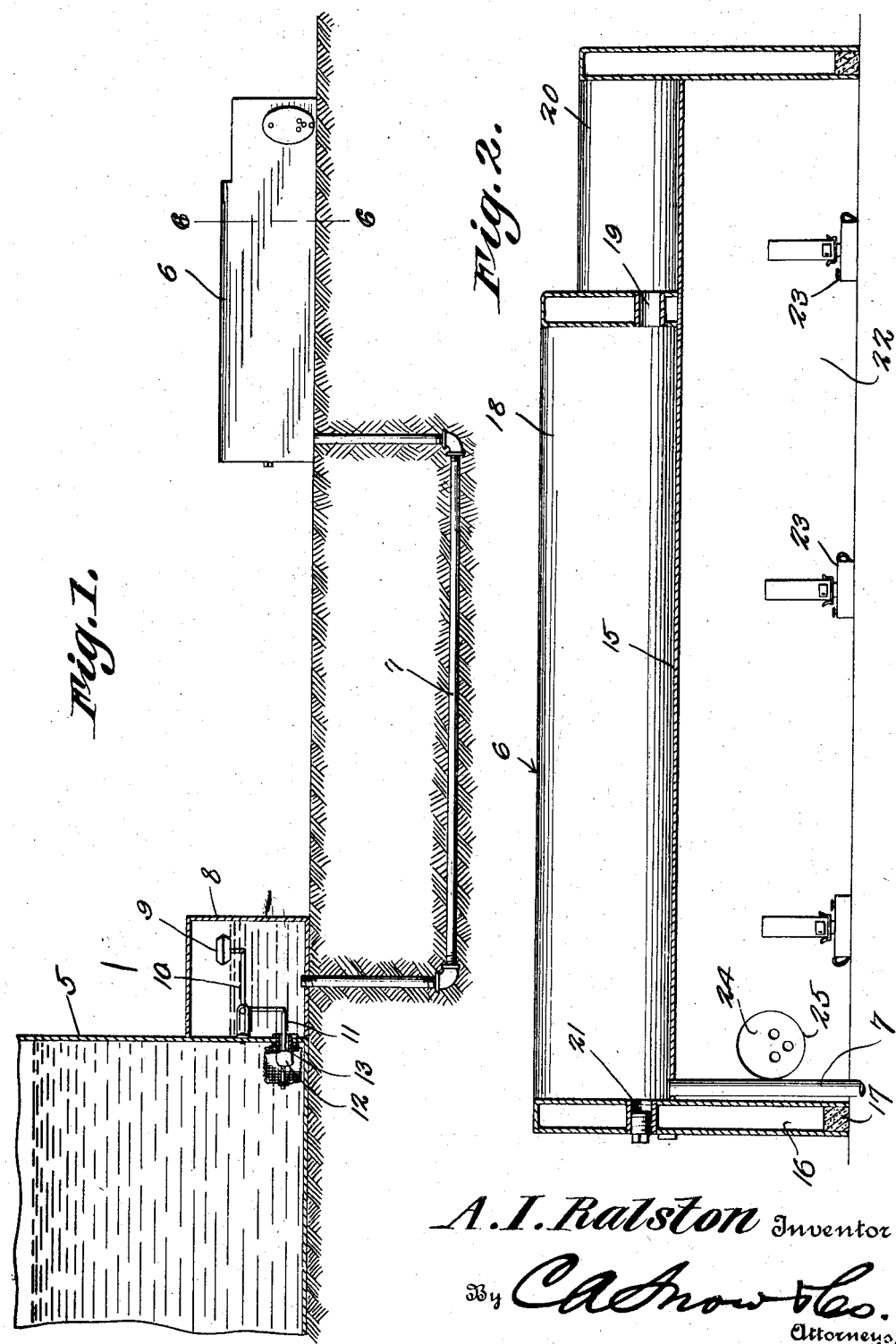
A. I. Ralston Inventor
By C. A. Snow & Co.
Attorneys.

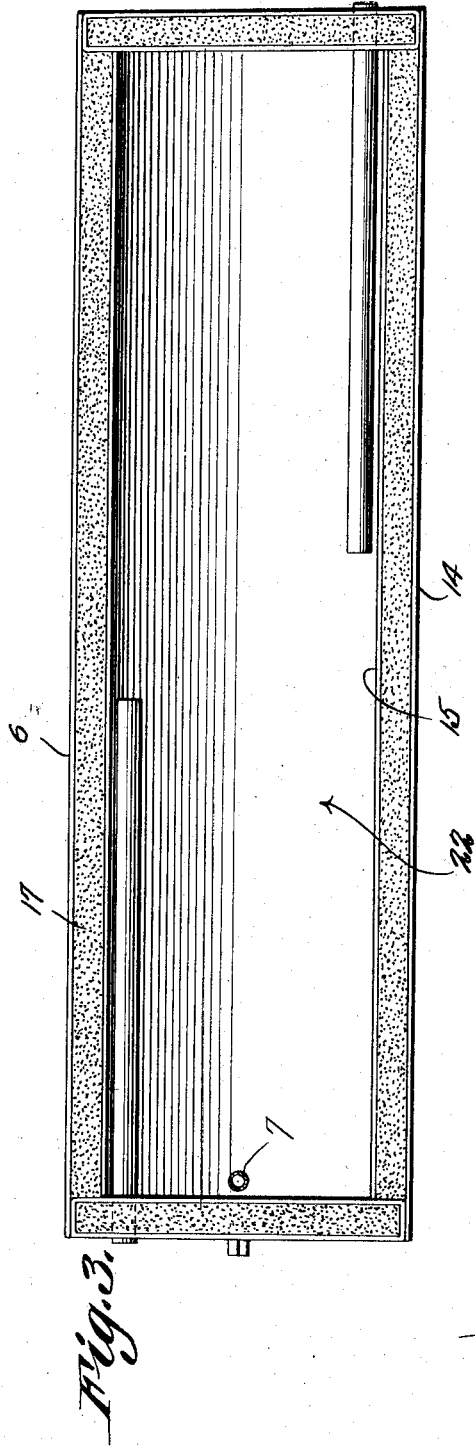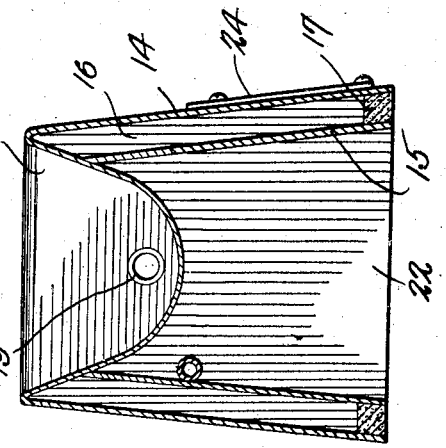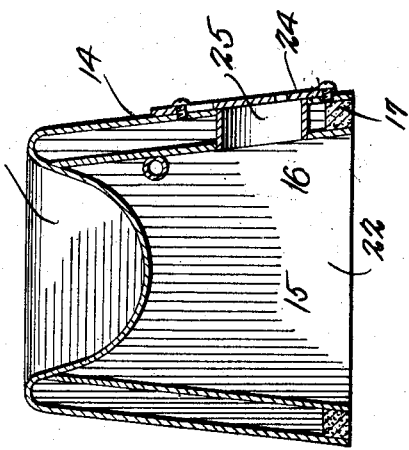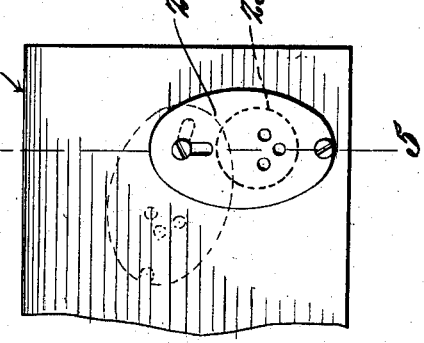

Patented July 7, 1931

1,813,318

UNITED STATES PATENT OFFICE

ALFRED I. RALSTON, OF OMAHA, NEBRASKA

STOCK WATERER

Application filed April 27, 1926. Serial No. 105,002.

The present invention relates to a watering device especially designed for use in barnyards, pastures or the like, the primary object of the invention being to provide means for maintaining the water in the trough portion of the device at a predetermined temperature, thereby preventing freezing of the water in cold weather.

A further object of the invention is to provide a device of this character wherein the trough will be fed with water automatically as the water is used from the trough.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a diagrammatic view of a watering trough and feed tank constructed in accordance with the invention.

Figure 2 is a longitudinal sectional view through the trough proper.

Figure 3 is a bottom plan view of the trough.

Figure 4 is a fragmental elevational view illustating one of the closures for the lamp compartment.

Figure 5 is a sectional view taken on line 5—5 of Figure 4.

Figure 6 is a sectional view taken on line 6—6 of Figure 1.

Referring to the drawings in detail, the device includes a supply tank 5, a trough 6 and a feed pipe 7 which establishes communication between the sources of water supply and the trough.

The tank 5 may be of any desired construction and size, the capacity of the tank being determined by considering the use to which the device is to be placed. Communicating with the tank 5 is a float chamber 8 in which the float 9 operates, the float 9 being carried at one end of the bell crank 10, the opposite end thereof having connection with the rod 11 on which the valve member 12 is positioned, the valve member 12 being constructed to engage the valve seat 13, when the float 9 is moved to the limit of its upward movement and cut off the supply of water to the float chamber 8.

The trough section is of a novel construction and includes an outer wall 14 and an inner wall 15 spaced from the wall 14 to provide a dead air space 16, the lower portion of the dead air space being closed by means of the cork or other suitable material indicated at 17.

An inner trough is indicated generally by the reference character 18 and the forward wall thereof is provided with an outlet opening 19 that permits water to flow from the inner trough 18 to the drinking compartment 20. The pipe 7 extends into the bottom of the inner trough so that water may pass from the float chamber through the pipe 7 and into the trough 18.

As clearly shown by Figures 5 and 6 of the drawings, the trough is spaced from the surface on which the same is positioned providing a lamp compartment 22 in which the lamps 23 are positioned, the lamps acting to heat the trough and water contained therein to maintain the water at a predetermined temperature.

Closures 24 are provided and are adapted to close the opening 25 through which the lamps 23 may be lighted or removed for filling purposes.

From the foregoing it will be obvious that as water flows from the float chamber 8, the float contained therein will move downwardly moving the valve member 12 to permit water to pass into the float chamber 8 from where it may pass through the pipe 7 into the watering trough.

It might be further stated that while it is preferable to construct the device of galvanized iron, the device may be constructed of concrete with equally as good results or it may be within the scope of the invention to construct the trough of both galvanized iron and concrete.

I claim:

In a watering trough for out door use, a body portion including an outer member formed with downwardly extended portions defining the sides of the body portion and having a central depressed portion extending throughout the width and length of the body portion defining a trough, inner walls spaced from the downwardly extended portions of the body portion, the upper edges of the inner walls engaging the depressed portion providing a space between the walls and depressed portion, means for closing the space at the base thereof to provide a dead air space, said inner walls defining an inner heating chamber under the depressed portion, and burners in the heating chamber.

In testimony that I claim the foregoing as my own, I have hereto affixed my signature.

ALFRED I. RALSTON.